3,842,125
PROCESS FOR THE PRODUCTION OF
(+)-TRANS-CHRYSANTHEMIC ACID
Fukashi Horiuchi and Akio Higo, Nishiinomiya, and Hirosuke Yoshioka, Ikeda, Japan, assignors to Sumitomo Chemical Company, Limited, Higashi-ku, Osaka, Japan
No Drawing. Filed Dec. 29, 1972, Ser. No. 319,705
Claims priority, application Japan, Jan. 7, 1972, 47/4,821
Int. Cl. C07c 61/04
U.S. Cl. 260—514 H                                         4 Claims

ABSTRACT OF THE DISCLOSURE (+)-Trans-chrysanthemic acid is effectively obtained by the optical resolution of (±)-trans- or (±)-cis, trans-chrysanthemic acid using (—)-α-(1-naphthyl)-ethylamine.

The present invention relates to a process for producing (+)-trans-chrysanthemic acid represented by the formula I.

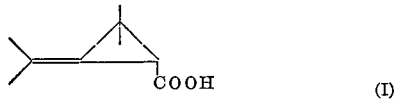

More particularly, the invention is concerned with a process for producing (+)-trans-chrysanthemic acid characterized by the optical resolution of (±)-trans-chrysanthemic acid or (±)-cis, trans-chrysanthemic acid with an optically active (—)-α-(1-naphthyl)-ethylamine.

(+)-1R:3R-2,2-Dimethyl-3-isobutenyl-1,3 - transcyclopropane-1-carboxylic acid, commonly called (+)-trans-chrysanthemic acid, in the present invention constitutes the acid part of pyrethrins which occur in pyrethrum plants and are known to be insecticidally active.

In recent years the problem of environmental pollution caused by agricultural chemicals has become a focus of adverse criticism. Among such agricultural chemicals, insecticieds are in many cases used indoors and therefore their low mammalian toxicity and their facile decomposition to non-toxic substances are particularly demanded. In this respect, natural pyrethrins and their related synthetic insecticides, i.e. allethrin, phthalthrin, etc. have satisfactory properties and are widely used at present. However, in the production of chrysanthemic acid in an industrial manner, it is inevitable that the acid is obtained as a mixture of four acids, that is to say, cis and trans geometrical isomers, each including optical antipodes. When the esters of these acids with (±)-allethrolone as the alcoholic part are evaluated with their insecticidal potencies, the ester of (+)-trans-chrysanthemic acid is remarkably superior to others. Accordingly, the production of (+)-trans-chrysanthemic acid in an industrial manner has been studied as a very important problem. However, in spite of long years' attempts at its technical development, any industrially advantageous process has not been found up to this time.

A known process for this purpose is that of Ishbel (J. Sir. Food Agric., 3, 189 (1952)). However, this process has such drawbacks that the desired (+)-trans-chrysanthemic acid is obtained in low yields by repeating the optical resolution operation twice and that quinine is used which is a naturally occurring alkaloid that is high-priced and its supply is limited. There is also a known process using D-(—)-threo - 1 - para - nitrophenol-2-dimethyl-aminopropane-1,3-diol as an optical resolving agent (French Pat. No. 1,536,485 specification). However, the use of this optically active amine is not economical from an industrial viewpoint. Also, the process by Ueda et al. (Japanese patent publication No. 20,382/1971) is not satisfactory to obtain pure (+)-trans-chrysanthemic acid on an industrial scale. In the case of using L-lysine as the resolving agent (Japanese patent publication No. 30,832/1971), the industrial practice of the process is accompanied with difficulties in recovering and reusing the L-lysine.

As a result of long years' intensive researches to overcome these disadvantages, the present inventors have found that (+)-trans-chrysanthemic acid can be obtained in high yield and in high purity through simple operation by using an optically active amine which is industrially available at low costs. The present invention has been accomplished on this finding.

Thus, the present invention is to provide a process for isolation of (+)-trans-chrysanthemic acid, which comprises dissolving (±)-trans-, or (±)-cis, trans-chrysanthemic acid in an organic solvent, adding (—)-α-(1-naphthyl)-ethylamine to the solution, cooling the resulting homogeneous solution to deposit crystals of the amine salt of (+)-trans-chrysanthemic acid, decomposing the salt by an acid or an alkali, and recovering (+)-trans-chrysanthemic acid.

The process of the present invention is illustrated in more detail as follows.

One mol of (±)-trans-chrysanthemic acid or (±)-cis, trans-chrysanthemic acid is dissolved in a solvent and 0.5 to 1.5 mols of (—)-α-(1-naphthyl)-ethylamine is added thereto with stirring to form a homogeneous solution. The solvent includes water, lower alkyl alcohols such as methanol, ethanol, n-propanol, iso-propanol, n-butanol, iso-butanol, sec.-butanol and tert.-butanol, ethers such as ethyl ether, isopropyl ether, butyl ether, dioxane and tetrahydrofuran, and aliphatic ketones such as acetone and isobutylmethyl ketone, and a mixture thereof. To form a homogeneous solution, the mixture may be heated, if necessary. Thereafter, the solution is cooled to a temperature between about —30° C. and room temperature, and the resulting crystals of the amine salt are collected by filtration.

The salt may be recrystallized from a suitable solvent to obtain the salt of higher purity. The salt thus obtained is decomposed with an acid such as hydrochloric acid or sulfuric acid, etc. in the presence of an organic solvent and then an organic layer and aqueous layer are separated. The organic layer is washed with water and concentrated under reduced pressure to obtain (+)-trans-chrysanthemic acid. The aqueous layer is rendered alkaline with an alkali, and the oily substance thus formed is extracted with an organic solvent. The organic layer is washed with water and concentrated in vacuo to obtain (—)-α-(1-naphthyl)-ethylamine. An alternative operation is as follows. The salt is decomposed with an alkali such as caustic soda etc. in the presence of an organic solvent and then an organic layer and aqueous layer are separated. The organic layer is washed with water and concentrated in vacuo to recover (—)-α-(1-naphthyl)-ethylamine. The aqueous layer is rendered acidic with an acid. The formed oily substance is extracted with an organic solvent and the organic layer is washed with water and concentrated in vacuo to obtain (+)-trans-chrysanthemic acid. Thus, optically active (+)-trans-chrysanthemic acid is obtained by the simple operation and recovery of the optically active amine is accomplished in a quantitative yield.

As is clear from the above illustration it is possible to obtain the desired (+)-trans-chrysanthemic acid alone from a mixture of (±)-cis and (±)-trans-chrysanthemic acids in high purity and in high yield and the resolution reagent amine can be very easily recovered with high yield. Thus, the process of the present invention is an extremely excellent technique in these points.

The process of the present invention is explained in more detail with reference to the following examples, which are only illustrative but not limitative.

EXAMPLE 1

16.8 g. of (±)-trans-chrysanthemic acid was dissolved in 120 ml. of anhydrous ethanol and 17.1 g. of (—)-α-(1-naphthyl)-ethylamine was added to the solution. The solution was allowed to stand in a refrigerator. Thereafter, the crystals were collected by filtration. The crystals were then recrystallized from 60 ml. of anhydrous ethanol to obtain 10.7 g. of white crystals, m.p.=144.5–145.5° C.; $[\alpha]_D^{24}=-19.90$ (dimethyl sulfoxide). The crystals were dissolved in a 10% aqueous caustic soda solution. The oily layer was extracted with ether and 5.2 g. of (—)-α-(1-naphthyl)-ethylamine was recovered. The aqueous layer was acidified with hydrochloric acid and extracted with ether to obtain 5.2 g. of (+)-trans-chrysanthemic acid. Yield=62%; $[\alpha]_D^{25}=+14.6$ (ethanol). Also, 11.1 g. of the amine was recovered from the ethanol mother liquid.

EXAMPLE 2

A mixture consisting of 16.8 of (±)-trans-chrysanthemic acid and 1.5 g. of ±-cis-chrysanthemic acid was dissolved in 120 ml. of anhydrous ethanol and 17.1 g. of (—)-α-(1-naphthyl)-ethylamine was added to the solution. Thereafter, the same treatment was carried out as in Example 1 and 5.1 g. of (+)-trans-chrysanthemic acid was obtained. $[\alpha]_D^{25}=+14.5$ (ethanol). By gas chromatographic analysis, this product was found to contain less than 1% of the cis acid.

EXAMPLE 3

A mixture of 16.8 g. of (±)-trans-chrysanthemic acid and 17.1 g. of (—)-α-(1-naphthyl)-ethylamine was dissolved in 120 ml. of 95% hydrous ethanol under heating. The solution was allowed to cool to 25° C. and kept for 2 hours at the same temperature while being stirred. The crystals were collected by filtration to obtain the crude salt. The crude salt was recrystallized from said ethanol to give 9.2 g. of white crystals, m.p. 145 to 146° C. The crystals were treated according to the procedure similar to that of Example 1 to obtain 4.3 g. of (+)-trans-chrysanthemic acid, yield 51.2%, $[\alpha]_D^{25}=+14.8°$ (ethanol).

EXAMPLE 4

Example 3 was repeated except that isopropyl ether-ethanol (2:1) was used in place of hydrous ethanol, whereby 12.2 g. of white crystals, m.p. 145 to 147.5° C. were obtained. The crystals were treated according to the procedure similar to that of Example 1 to give 5.8 g. of (+) - trans - chrysanthemic acid, yield 69.0%, $[\alpha]_D^{25}=+14.7°$ (ethanol).

EXAMPLE 5

Example 4 was repeated except that a mixture of (±)-trans-, (±)-cis- (88:12) chrysanthemic acids was treated in place of (±)-trans-chrysanthemic acid, whereby 10.7 g. of white crystals, m.p. 145 to 146° C., were obtained. The crystals were treated according to the procedure similar to that of Example 1 to obtain 5.1 g. of (+)-trans-chrysanthemic acid, yield 69%, $[\alpha]_D^{25}=+14.6°$ (ethanol). By gas chromatographic analysis, this product was found to contain less than 1% of the cis acid.

EXAMPLE 6

Example 3 was repeated except that acetone was used in place of hydrous ethanol, whereby 12.4 g. of white crystals, m.p. 144 to 145° C., were obtained. The crystals were treated according to the procedure similar to that of Example 1, to obtain 5.9 g. of (+)-trans-chrysanthemic acid, yield 70.2%, $[\alpha]_D^{25}=+14.5°$ (ethanol).

What is claimed is:
1. A process for isolation of (+)-trans-chrysanthemic acid, which comprises dissolving (±)-trans-chrysanthemic acid or (±)-cis, trans-chrysanthemic acid in a solvent selected from the group consisting of water, lower alkyl alcohols, lower alkyl ethers, dioxane, tetrahydrofuran, lower alkyl ketones and a mixture thereof, adding (—)-α-(1-naphthyl)-ethylamine to the solution, cooling the resulting homogeneous solution to deposit crystals of the amine salt of (+)-trans-chrysanthemic acid, decomposing the salt by an acid or an alkali, and recovering (+)-trans-chrysanthemic acid.
2. The process according to claim 1, wherein the amount of (—)-α-(1-naphthyl)-ethylamine is 0.5 to 1.5 mols per mol of (±)-trans-chrysanthemic acid or (±)-cis, trans-chrysanthemic acid.
3. The process according to claim 1, wherein the homogeneous solution is cooled to a temperature between about —30° C. and room temperature.
4. A process according to claim 1, wherein the solvent is water, a lower alkyl alcohol, ethyl ether, isopropyl ether, butyl ether, tetrahydrofuran, acetone, or isobutyl methyl ketone.

References Cited

UNITED STATES PATENTS

| | | | |
|---|---|---|---|
| 2,996,545 | 8/1961 | Bottoms | 260—570.8 |
| 3,739,019 | 6/1973 | Ueda et al. | 260—514 H |

OTHER REFERENCES

Campbell et al., J. Sci. Food Agri., 3, 189–192 (1952).
Elliel, "Stereochemistry of Carbon Compounds," p. 50 (1962).

LORRAINE A. WEINBERGER, Primary Examiner

M. SHIPPEN, Assistant Examiner